Jan. 29, 1929.
R. E. WELLS
1,700,188
BEARING MOUNTING
Filed Jan. 12, 1926
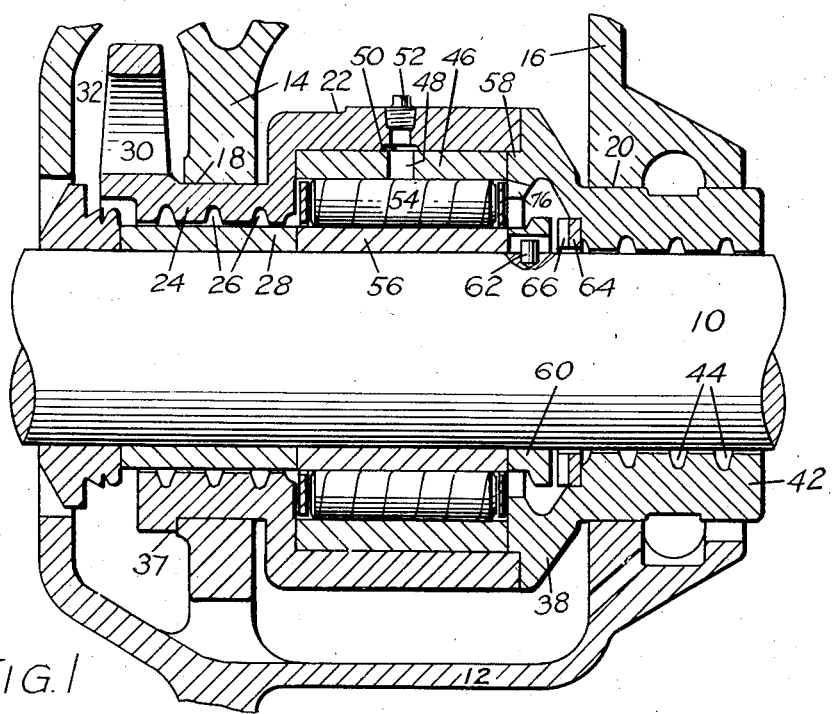
FIG. 1
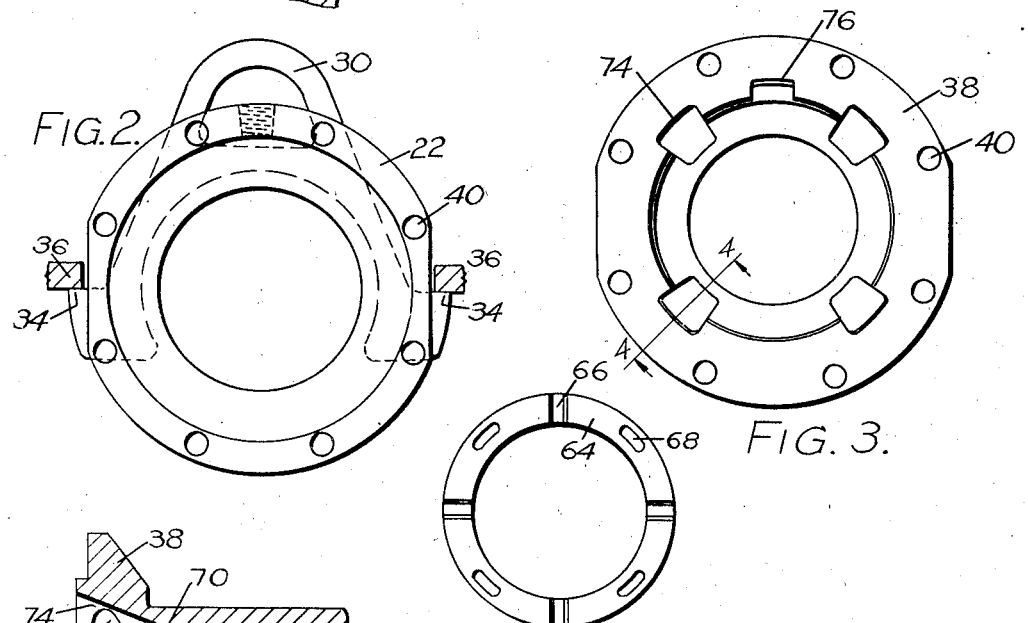
FIG. 2
FIG. 3.
FIG. 4
FIG. 5.
INVENTOR:
REGINALD E. WELLS,
BY
HIS ATTORNEY.

Patented Jan. 29, 1929.

1,700,188

UNITED STATES PATENT OFFICE.

REGINALD E. WELLS, OF EAST ORANGE, NEW JERSEY, ASSIGNOR TO GENERAL MOTORS CORPORATION, OF DETROIT, MICHIGAN, A CORPORATION OF DELAWARE.

BEARING MOUNTING.

Application filed January 12, 1926. Serial No. 80,733.

This invention relates to bearing mountings and comprises all the features of novelty herein disclosed as embodied in an antifriction mounting for replacing plain bearings of a motor shaft.

Motor shafts are frequently mounted at both ends in plain bearings or bushings held in a divided frame one section of which is removable to allow insertion or removal of the bearings. Plain bearings require an oil film for lubrication and the oil will leak along the shaft and damage the motor windings. An object of this invention is to provide an improved antifriction bearing mounting which can utilize grease for lubrication, thereby protecting the motor, and one which will replace the usual plain bearings with a minimum alteration in the motor frame and also effectively take end thrust while allowing the armature to locate itself in the magnetic center of the frame.

To these ends and also to improve generally upon devices of the character indicated the invention consists in the various matters hereinafter described and claimed.

In the drawings, Figure 1 is a vertical section.

Figure 2 is an end view of the bearing housing.

Figure 3 is an end view of the end cap.

Figure 4 is a sectional view of a portion of the end cap on line 4—4 of Figure 3.

Figure 5 is an end view of the thrust plate.

The numeral 10 represents a shaft, such as the armature shaft of an electric motor, and 12 one end of a divided frame such as that commonly employed to support a motor shaft by plain bearings. An armature may be carried by the shaft to the left of Figure 1 and the other end of the shaft, beyond the armature, is preferably supported in a duplicate part of the same frame in the same manner as the end shown. The upper and lower mating sections of the frame 12 have webs 14 and 16 which together form cylindrical bores 18 and 20, respectively, ordinarily receiving plain cylindrical bearings or bushings for a shaft. According to the present invention, such plain bearings are replaced by an auxiliary housing with an antifriction bearing, the latter being shown as a roller bearing having the same external diameter as the bores 18 and 20.

The bearing housing preferably comprises a body section and a cap section, the body section having an enlarged portion 22 and a reduced extension 24 of considerable axial extent. The extension has a series of grease grooves 26 surrounding a spacing sleeve 28 on the shaft so that grease can be used for lubrication and retained effectively in the housing. The usual plain bearings require an oil film and the oil will easily work along the shaft and damage the motor windings. In the case of heavy motors, a bail 30 is preferably formed on each housing to project upwardly, as into the compartment 32, so that, when the upper section of the main frame is lifted, the armature, the shaft, the bearings and their housings can be readily hoisted out without disturbing the fit of the bearings on the shaft while keeping them protected. One end of the housing has oppositely projecting lugs 34 to engage under shoulders 36 of the frame thus to hold the housing from rotation. The housing also has a shoulder 37 to engage the frame and limit movement in one direction. An end cap 38 having bolt holes 40 is bolted to the body section and has an extension 42 with grease grooves 44 around the shaft.

In the enlarged portion 22 of the housing is an outer race ring or sleeve 46 having one or more openings 48 communicating with an annular groove 50 to which grease is supplied at the threaded plug 52. Rollers 54 in a suitable cage are interposed between the outer race sleeve and an inner race ring or sleeve 56 fitting the shaft. An annular flange 58 on the end cap projects into the housing against the end of the outer race ring. A hardened thrust collar 60 surrounds the shaft and has an interior slot engaging slidably with a pin 62 set into the shaft. The collar has a flat thrust face initially set a little distance from a bronze thrust plate 64 so that the armature can locate itself endwise and run in the magnetic center of the frame.

The thrust plate is a ring having a clearance with the shaft and held in an annular seat in the end cap. The plate has a series of radial slots 66 in its thrust face to form grease pockets for self lubrication. Circumferentially extending openings 68, arranged as shown in Figure 5, allow passage of lubricant to the thrust faces from registering slots or recesses 70 formed at intervals in the end cap behind the seat of the thrust plate. The slots or recesses 70 communicate with a groove 72 of the end cap and with the bearings by means of the slots 74. At the top, the groove 72 communicates with the bearings by an additional slot 76 which registers with one of the radial slots 66.

Although the apparatus has been described by reference to a specific construction, it should be understood that the invention, in its broader aspects, is not necessarily limited to the form selected for mere illustrative purposes.

I claim:

1. In a bearing mounting, in combination, a shaft, a frame having spaced webs with cylindrical openings, a removable housing having an enlarged bearing receiving portion between the webs and reduced cylindrical extensions fitting in the openings of the webs, and an antifriction bearing in the enlarged portion of the housing and interposed between the shaft and the housing; substantially as described.

2. In a bearing mounting, in combination, a shaft, a frame, a removable bearing housing supported on the frame around the shaft, said housing having an end cap, an outer race ring fitting in the housing, an inner race ring on the shaft, antifriction rollers between the race rings, a thrust plate in the end cap, a thrust collar abutting the inner race ring and slidably keyed to the shaft, and means for lubricating the engaging faces of the thrust plate and the collar; substantially as described.

3. In a bearing mounting, a shaft, a frame, a removable bearing housing supported on the frame around the shaft, said housing having an end cap, an antifriction bearing in the housing for rotatably supporting the shaft, a thrust plate set in a recess of the end cap and having lubricant receiving openings, means for conducting lubricant from the antifriction bearing to the openings, a thrust collar between the thrust plate and the bearing, and means for slidably connecting the thrust collar to the shaft; substantially as described.

4. In a bearing mounting, a shaft, a bearing housing surrounding the shaft and having an end cap, an antifriction bearing in the housing for rotatably supporting the shaft, a thrust plate abutting the end cap and having lubricant openings, said end cap having slots communicating with the openings in the thrust plate and with the antifriction bearing, and a thrust collar on the shaft and arranged to transmit end thrust of the shaft to the thrust plate; substantially as described.

5. In a bearing mounting, a shaft, a bearing housing surrounding the shaft and having an end cap, an antifriction bearing in the housing for rotatably supporting the shaft, a thrust plate abutting the end cap and having lubricant openings and lubricant holding slots, said end cap having an internal groove and slots connecting the groove with the openings in the plate and with the antifriction bearing, and a thrust collar on the shaft and arranged to transmit end thrust of the shaft to the thrust plate; substantially as described.

6. In a bearing mounting, a shaft, a bearing housing surrounding the shaft and having an end cap, an outer race ring and a series of rollers in the housing, an inner race ring on the shaft, a thrust collar abutting the inner race ring and slidably keyed to the shaft, thrust receiving means on the end cap to engage the thrust collar for taking end thrust of the shaft, and said end cap having an annular groove surrounding the thrust collar with slots connecting the groove with the roller bearing and with the thrust faces; substantially as described.

7. In a bearing mounting, a shaft, a bearing housing surrounding the shaft, an antifriction bearing in the housing for rotatably supporting the shaft, a thrust plate in one end of the housing and having lubricant openings, a thrust collar slidably keyed to the shaft and interposed between the bearing and the thrust plate, and passage extending around the thrust plate for conducting lubricant from the bearing to the openings in the thrust plate; substantially as described.

8. In a bearing mounting, a shaft, a bearing housing surrounding the shaft and having an end cap, an antifriction bearing in the housing for rotatably supporting the shaft, a thrust plate set in a recess of the end cap and having circumferentially extending lubricant openings and radially extending slots, said end cap having an internal groove and slots leading around said thrust plate to the openings in the latter, said end cap also having slots leading from said groove to the bearings, a thrust collar slidably keyed to the shaft and interposed between the thrust plate and the bearing, and means for admitting lubricant to the bearing; substantially as described.

9. In a bearing mounting, in combination, a shaft, a frame having spaced webs with cylindrical openings, a removable bearing housing having an enlarged bearing receiving portion between the webs and reduced cylindrical extensions fitting in the openings of the webs, an outer race ring fitting in the housing, an inner race ring on the shaft, antifriction rolling elements between the race rings, a thrust plate in the bearing housing and surrounding the shaft, and a thrust collar on the shaft between the inner race ring and the thrust plate; substantially as described.

In testimony whereof I hereunto affix my signature.

REGINALD E. WELLS.